(12) United States Patent
Schoonover et al.

(10) Patent No.: US 7,793,770 B1
(45) Date of Patent: Sep. 14, 2010

(54) CONVEYOR WHEEL SLIDING SYSTEM

(76) Inventors: Albert G. Schoonover, 1023 West Ave. B, Bismarck, ND (US) 58501-2407; Gordon L. Schoonover, 721 79th Ave. NE, Bismarck, ND (US) 58503

( * ) Notice: Subject to any disclaimer, the term of this patent is extended or adjusted under 35 U.S.C. 154(b) by 826 days.

(21) Appl. No.: 11/688,173

(22) Filed: Mar. 19, 2007

(51) Int. Cl.
*B65G 21/10* (2006.01)
(52) U.S. Cl. .................................. 198/312; 198/315
(58) Field of Classification Search ............... 198/312, 198/315, 860.1, 861.1
See application file for complete search history.

(56) References Cited

U.S. PATENT DOCUMENTS

| | | | | |
|---|---|---|---|---|
| 2,631,715 | A * | 3/1953 | Vickers ...................... | 198/812 |
| 2,759,591 | A * | 8/1956 | Erickson ................... | 198/316.1 |
| 2,967,602 | A * | 1/1961 | Mosier ...................... | 198/316.1 |
| 4,058,198 | A * | 11/1977 | O'Neill et al. .............. | 198/313 |
| 4,899,869 | A * | 2/1990 | Johnson ...................... | 198/603 |
| 6,068,111 | A * | 5/2000 | Smith et al. ................. | 198/812 |
| 6,244,418 | B1 * | 6/2001 | Desrochers .............. | 198/316.1 |
| 6,471,031 | B1 * | 10/2002 | Duncalf ....................... | 198/311 |
| 6,488,140 | B2 * | 12/2002 | Eberle et al. ................ | 198/314 |
| 6,808,057 | B1 * | 10/2004 | Nirmal et al. ............... | 198/312 |
| 6,845,859 | B2 * | 1/2005 | Grundl ....................... | 198/314 |
| 6,910,586 | B2 * | 6/2005 | McCloskey ................. | 209/241 |
| 7,416,075 | B2 * | 8/2008 | Haustein et al. ............. | 198/812 |
| 7,422,096 | B2 * | 9/2008 | Crookston .................. | 198/346 |
| 7,438,173 | B1 * | 10/2008 | Schoonover et al. ........ | 198/312 |
| 7,448,486 | B1 * | 11/2008 | Frankl et al. ................ | 198/313 |
| 7,513,354 | B1 * | 4/2009 | Canapa ....................... | 198/312 |

OTHER PUBLICATIONS

Access, EarthWORKS Machinery Company, Catalog, Aug. 2005, p. 13.
Access, Sulley & Son's Enterprises, Catalog, Aug. 2005, p. 14.
Access, Rock Systems, Inc,, Catalog, Date Unknown.
Access, Inter-Mountain Construction, Catalog, Date Unknown.
Contractors Hot Line, Astec companies, Magazine, Jan. 7, 2005, p. 13.

* cited by examiner

*Primary Examiner*—Douglas A Hess
(74) *Attorney, Agent, or Firm*—Neustel Law Offices (57) ABSTRACT

A conveyor wheel sliding system for efficiently positioning the wheels upon a conveyor unit to a transporting position and also to an in use position. The conveyor wheel sliding system generally includes a conveyor unit including a frame, wherein the frame extends along a longitudinal axis of the conveyor unit, an attachment assembly to engage the frame, wherein a substantial portion of the attachment assembly is positioned below the frame and wherein the attachment assembly slidably adjusts about the frame and along the longitudinal axis of the conveyor unit and at least one wheel mechanically connected to the attachment assembly opposite the conveyor unit to engage a ground surface.

20 Claims, 6 Drawing Sheets

CONVEYOR WHEEL SLIDING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to aggregate material conveyors and more specifically it relates to a conveyor wheel sliding system for efficiently positioning the wheels upon a conveyor unit to a transporting position and also to an in use position.

2. Description of the Related Art

Any discussion of the prior art throughout the specification should in no way be considered as an admission that such prior art is widely known or forms part of common general knowledge in the field.

Aggregate material conveyors have been in use for years. Typically, aggregate material conveyors or apron feeders are utilized in transporting aggregate material (i.e. sand, gravel, etc.) from a stationary pile to a vehicle, wherein the vehicle transports the aggregate material away for use. Because of the large amounts of aggregate material generally needed to be conveyed at one time, the conveyors are generally very large in size.

When transporting the conveyor unit, there is generally a large portion of the conveyor unit that extends beyond the vehicle pulling the conveyor unit, wherein the extending portion is generally unsupported. This can be dangerous for other vehicles upon the road and to the vehicle transporting the conveyor unit. Because of the general lack of efficiency and practicality in the prior art there is the need for a new and improved conveyor wheel sliding system for efficiently positioning the wheels upon a conveyor unit to a transporting position and also to an in use position.

BRIEF SUMMARY OF THE INVENTION

The general purpose of the present invention is to provide a conveyor wheel sliding system that has many of the advantages of the aggregate material conveyors mentioned heretofore. The invention generally relates to an aggregate material conveyor which includes a conveyor unit including a frame, wherein the frame extends along a longitudinal axis of the conveyor unit, an attachment assembly to engage the frame, wherein a substantial portion of the attachment assembly is positioned below the frame and wherein the attachment assembly slidably adjusts about the frame and along the longitudinal axis of the conveyor unit and at least one wheel mechanically connected to the attachment assembly opposite the conveyor unit to engage a ground surface.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a conveyor wheel sliding system for efficiently positioning the wheels upon a conveyor unit to a transporting position and also to an in use position.

Another object is to provide a conveyor wheel sliding system that is easily adjusted between an in use position and a transporting position.

An additional object is to provide a conveyor wheel sliding system that allows for a conveyor unit to be sufficiently stabilized while transporting the conveyor unit from place to place.

A further object is to provide a conveyor wheel sliding system that allows for a conveyor unit to be sufficiently stabilized while the conveyor unit is in use.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 6 illustrate a conveyor wheel sliding system 10, which comprises a conveyor unit 20 including a frame 23, wherein the frame 23 extends along a longitudinal axis of the conveyor unit 20, an attachment assembly 30 to engage the frame 23, wherein a substantial portion of the attachment assembly 30 is positioned below the frame 23 and wherein the attachment assembly 30 slidably adjusts about the frame 23 and along the longitudinal axis of the conveyor unit 20 and at least one wheel 59 mechanically connected to the attachment assembly 30 opposite the conveyor unit 20 to engage a ground surface.

B. Conveyor Unit

Figure 3:
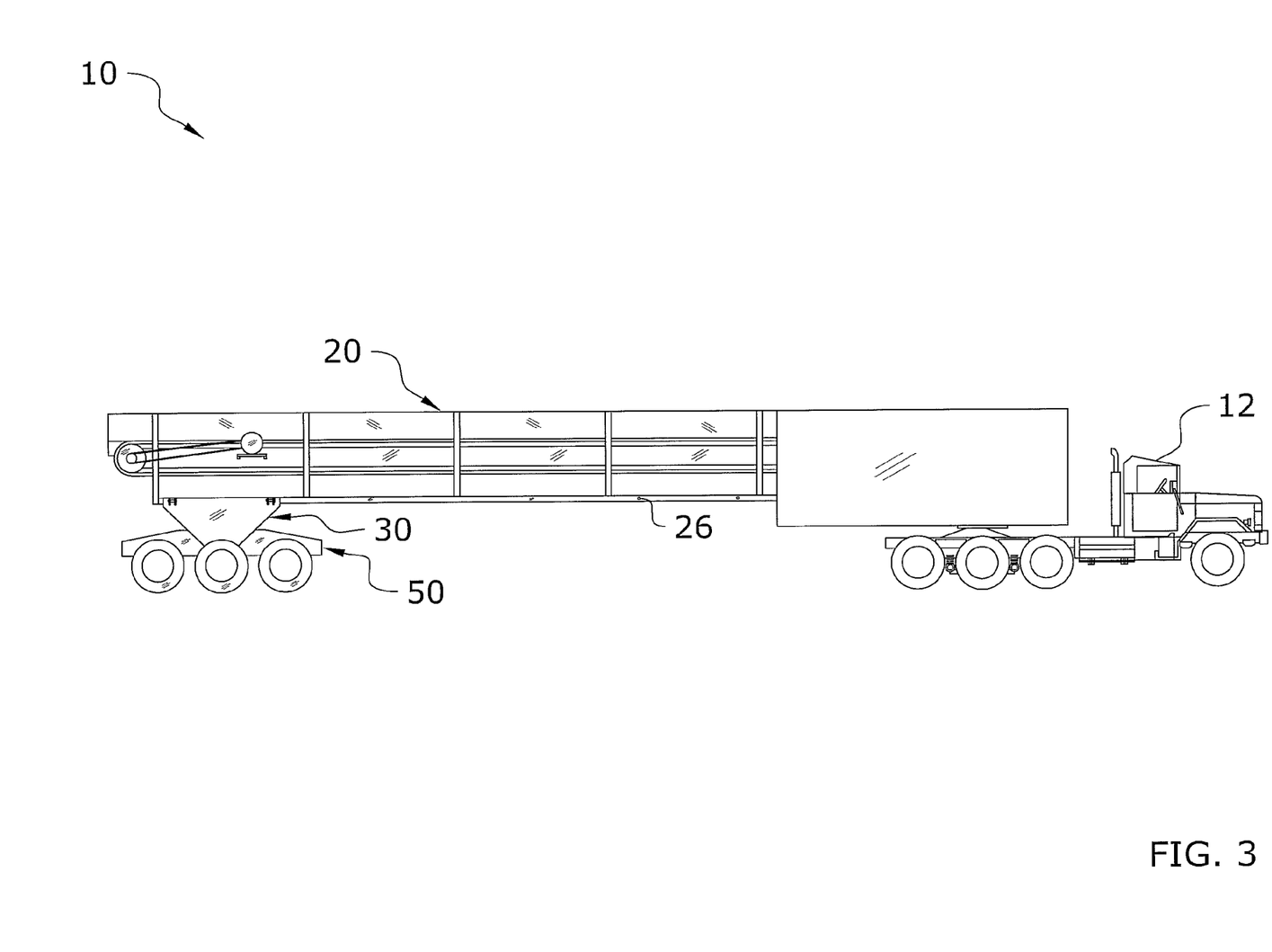
FIG. 3 is a side view of the present invention in the transport position and attached to a vehicle.

The conveyor unit 20 utilized with the present invention is preferably comprised of a standard aggregate material 14 conveyor unit 20 commonly utilized in conveying aggregate material 14 (i.e. gravel, sand, rocks, etc.) from a stationary pile or point to a vehicle 12, wherein the vehicle 12 generally transports the aggregate material 14 to a place of use. The conveyor unit 20 may be comprised of a configuration that is drivable or the conveyor unit 20 may be comprised of a configuration to be pulled or pushed by a separate vehicle 12 as illustrated in FIG. 3.

The conveyor unit 20 preferably includes a hitch 21 to removably attach to the vehicle 12 utilized to transport the conveyor unit 20. The conveyor unit 20 is also preferably comprised of a large and heavy duty conveyor unit 20 to handle large amounts of aggregate material 14 as shown in FIGS. 1 through 6. It is appreciated that the conveyor unit 20 utilized with the present invention may transport various materials, rather than aggregate materials 14.

Figure 5:
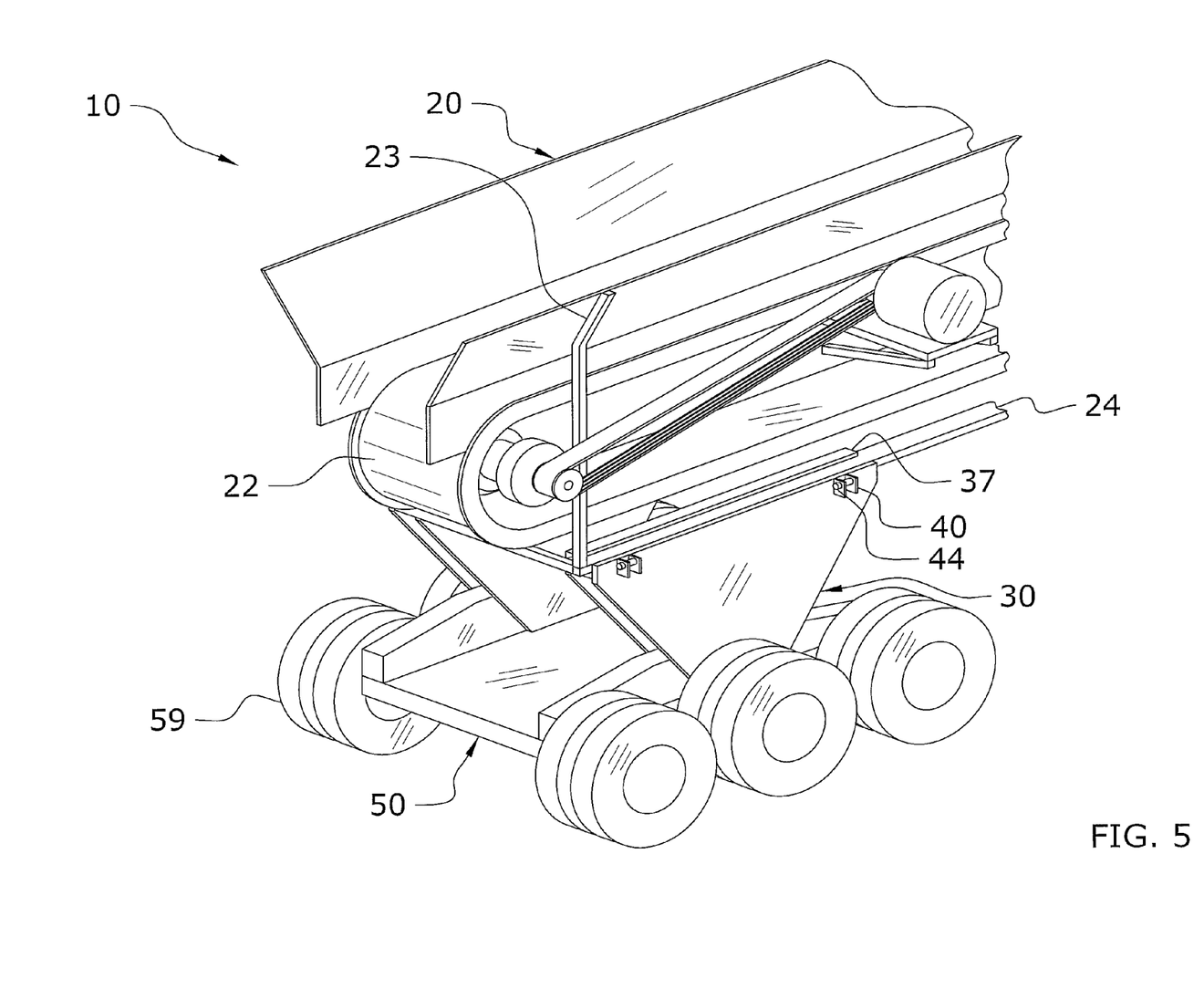
FIG. 5 is an upper perspective view of the present invention in the transport position.
Figure 6:
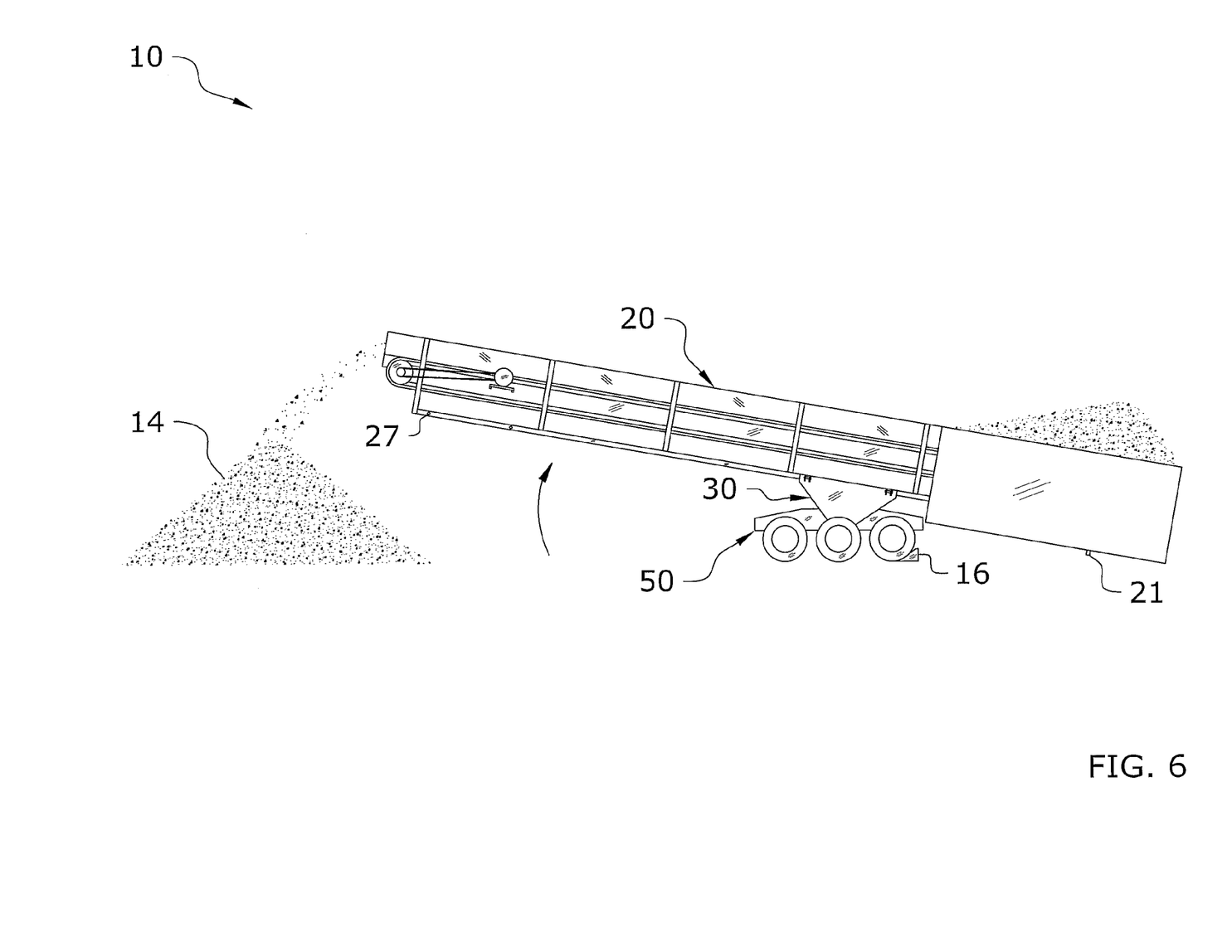
FIG. 6 is a side view of the present invention in use and with the conveyor unit pivoted upwards.

The conveyor unit 20 includes a conveying portion 22, wherein the conveying portion 22 circulates about the conveyor unit 20 and transports the aggregate material 14 from one point to another as illustrated in FIG. 6. The conveying portion 22 may be comprised of various materials, such as but not limited to metal, plastic or rubber. The conveying portion 22 is also preferably substantially surrounded by and supported by a frame 23. The frame 23 preferably extends along a longitudinal axis of the conveyor unit 20 as illustrated in FIGS. 1 through 6.

The frame 23 also preferably includes a pair of elongated members 24, 24' extending lengthwise along the frame 23. The elongated members 24, 24' preferably extend along a lower side of the frame 23 and connect the conveyor unit 20 to the attachment assembly 30 of the present invention as illustrated in FIGS. 1 through 6.

Figure 1:
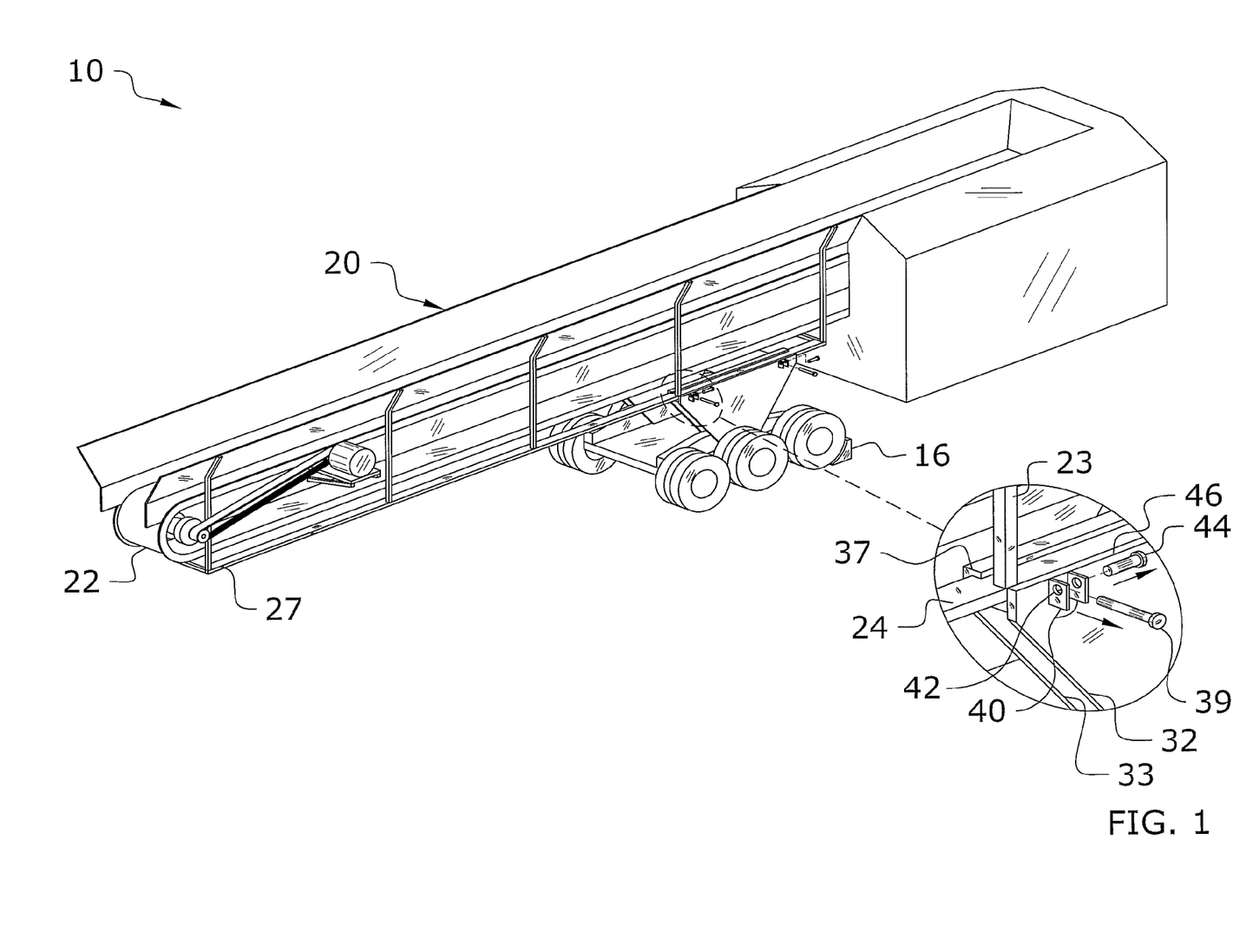
FIG. 1 is an upper perspective view of the present invention in an in use portion with a portion of the attachment assembly magnified and the first pins and second pins being removed.

Each of the elongated members 24, 24' also preferably includes a plurality of first apertures 26, 26' extending through one end of the frame 23 and a plurality of second apertures 27, 27' extending through an opposing longitudinal end of the frame 23. The first apertures 26, 26' and the second apertures 27, 27' preferably selectively align with the first openings 38, 38' of the attachment assembly 30. The attachment assembly 30 is selectively adjusted to either the first apertures 26, 26' or the second apertures 27, 27' depending on whether the conveyor unit 20 is being transported as illustrated in FIGS. 2, 3 and 5 or if the conveyor unit 20 is in normal use as illustrated in FIGS. 1 and 6.

C. Attachment Assembly

The attachment assembly 30 extends from the frame 23 of the conveyor unit 20 as illustrated in FIGS. 1 through 6. The attachment assembly 30 serves to slidably adjust about the frame 23 and conveyor unit 20 depending on whether the conveyor unit 20 is being transported or if the conveyor unit 20 is in use. The attachment assembly 30 is preferably comprised of a strong and durable material such as steel, wherein the attachment assembly 30 is able to support excessive amounts of weight and extended use. It is appreciated that the attachment assembly 30 may extend from various places of the frame 23; however it is preferred that a substantial portion of the attachment assembly 30 is positioned below the conveyor unit 20 and the frame 23.

Figure 2:
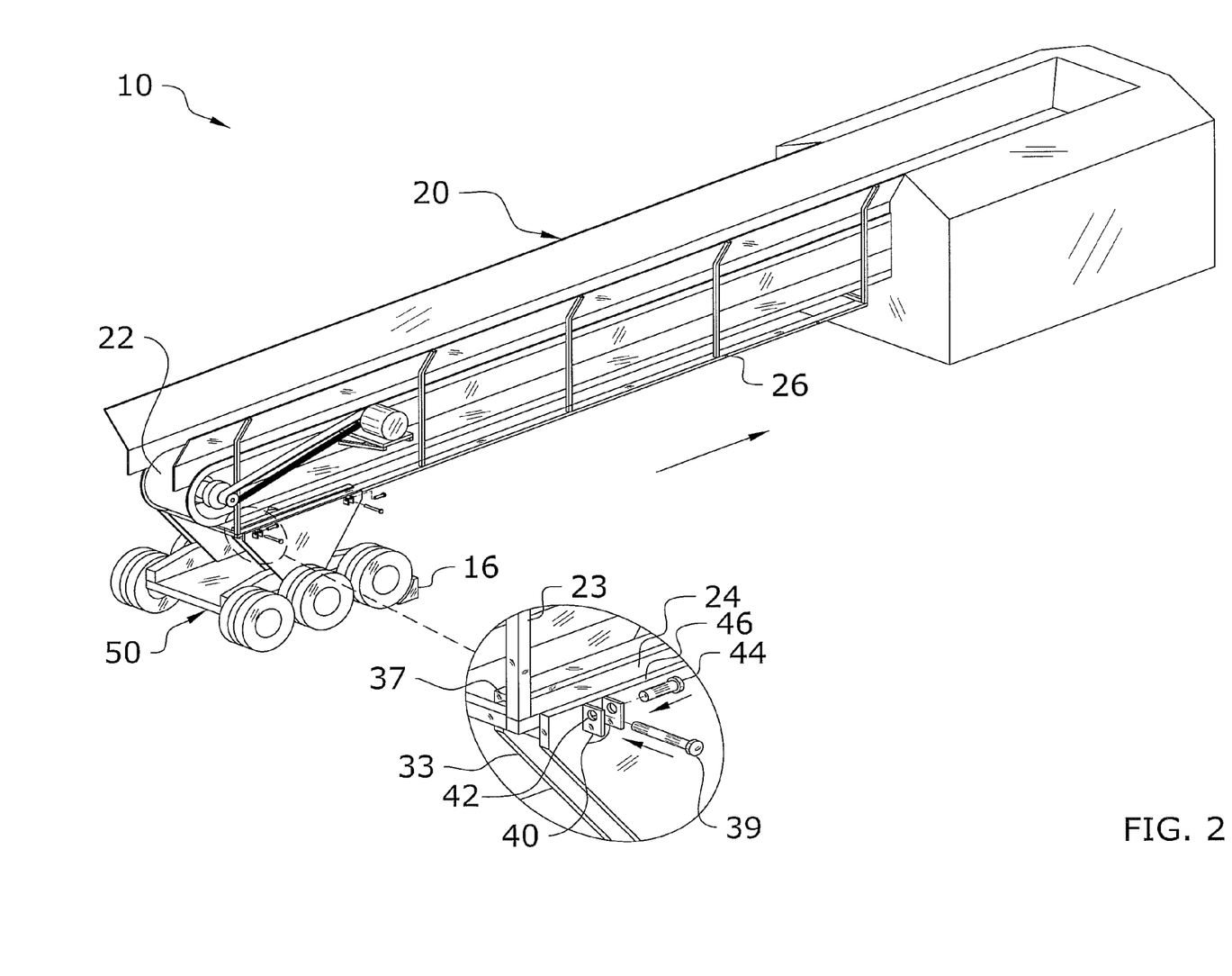
FIG. 2 is an upper perspective view of the present invention in a transporting position with a portion of the attachment assembly magnified and the first pins and second pins being attached.

During transport of the conveyor unit 20 the attachment assembly 30 is preferably slidably adjusted towards a rear of the conveyor unit 20 opposite the vehicle 12 so as to provide support for the rear of the conveyor unit 20 as illustrated in FIGS. 2 and 3. During use of the conveyor unit 20 the attachment assembly 30 is preferably slidably adjusted towards a front of the conveyor unit 20 adjacent the vehicle 12 to allow the conveying portion 22 and conveyor unit 20 to pivot and operate in a normal manner as illustrated in FIGS. 1 and 6.

The attachment assembly 30 further preferably slidably attaches and adjusts about opposing longitudinal elongated members 24, 24' of the frame 23 via a pair of connecting structures 31, 31'. Each of the connecting structures 31, 31' are preferably comprised of substantially similar configurations as illustrated in FIGS. 1 through 6. It is appreciated that more or less connecting structures 31, 31' may be utilized with the present invention if more or less support is desired for the conveyor unit 20. The connecting structures 31, 31' are preferably connected by at least one cross member 34 extending between the connecting structures 31, 31'.

The connecting structures 31, 31' each preferably includes an outer plate 32, 32' and an inner plate 33, 33', wherein each outer plate 32, 32' and inner plate 33, 33' are positioned adjacent to opposing sides of a respective elongated member 24, 24' of the frame 23. The outer plate 32, 32' and the inner plate 33, 33' are preferably comprised of a triangular shaped configuration as illustrated in FIGS. 1 through 3. It is appreciated however that the outer plate 32, 32' and the inner plate 33, 33' may be comprised of various configurations rather than the preferred embodiment. It is also appreciated that the connecting structure 31, 31' may include various other members or plates to extend along the elongated member 24, 24'.

Figure 4:
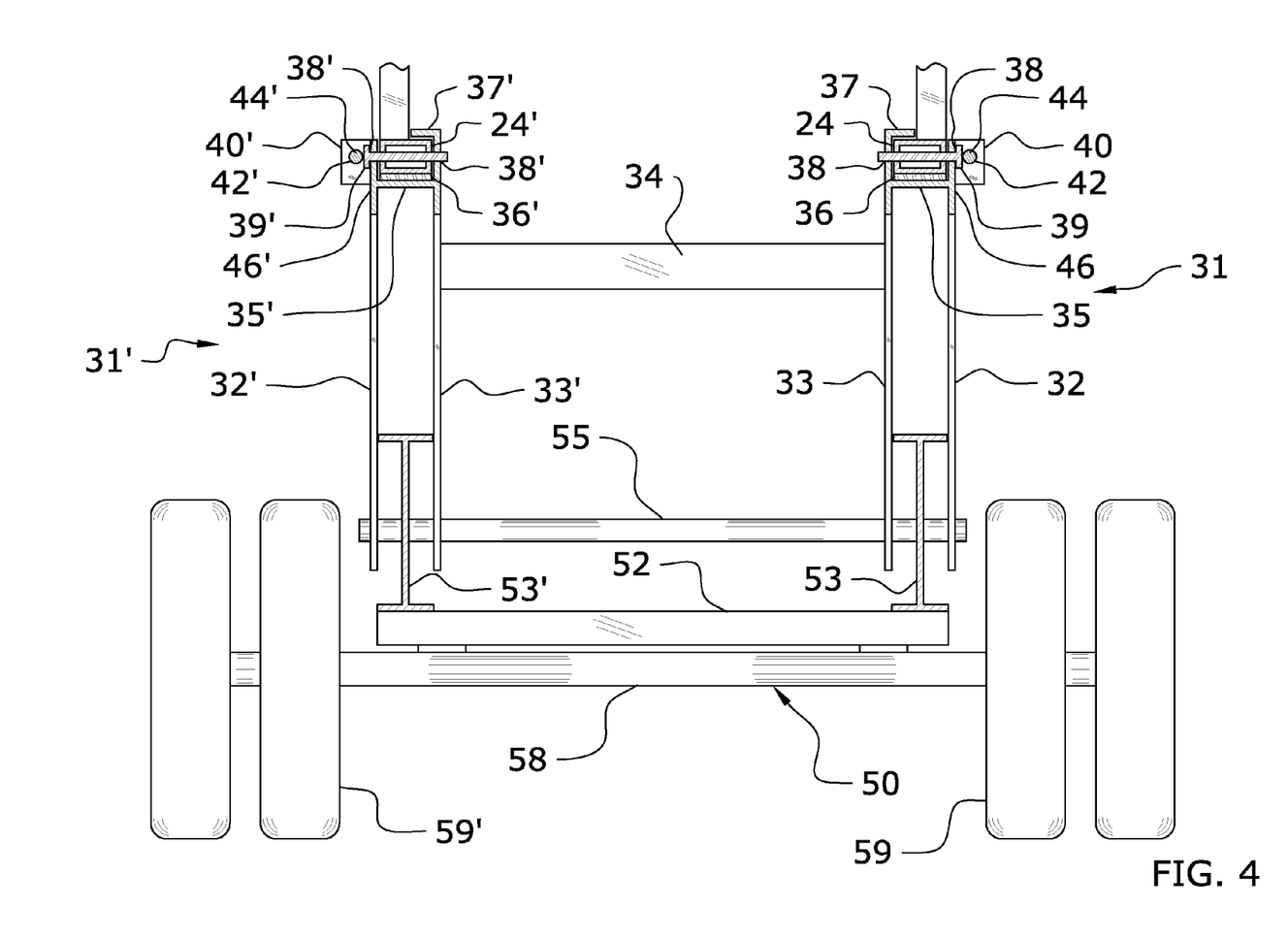
FIG. 4 is a cross-sectional view of the present invention.

Each outer plate 32, 32' and inner plate 33, 33' are preferably interconnected by a connecting member 35, 35' as illustrated in FIG. 4. The connecting member 35, 35' is preferably positioned near an upper end of the connecting structure 31, 31'. The connecting member 35, 35' is also preferably comprised of an elongated configuration to extend across an entire length of the respective connecting structure 31, 31'. The outer plate 32, 32', the inner plate 33, 33' and the connecting member 35, 35' preferably form a U-shaped structure, wherein the elongated member 24, 24' is positioned within the U-shaped structure formed by the outer plate 32, 32', the inner plate 33, 33' and the connecting member 35, 35'.

The attachment assembly 30 also preferably includes an engaging member 36, 36' as illustrated in FIG. 4. The engaging member 36, 36' preferably extends along an upper surface of the connecting member 35, 35'. The engaging member 36, 36' also assists the attachment assembly 30 in sliding easily along the frame 23. The engaging member 36, 36' further preferably substantially reduces a coefficient of friction between the attachment assembly 30 and the frame 23. The engaging member 36, 36' may be comprised of various materials. In the preferred embodiment of the present invention the engaging member 36, 36' is comprised of a plastic material.

Each inner plate 33, 33' preferably includes a lip 37, 37' extending towards the respective outer plate 32, 32' as illustrated in FIG. 4. The lip 37, 37' also preferably extends over a portion of the top of the elongated member 24, 24' so as to prevent the frame 23 and conveyor unit 20 from becoming disconnected from the attachment assembly 30 during transport or use.

Each connecting structure 31, 31' also preferably includes a plurality of first openings 38, 38' extending through an extending portion 46, 46' of the outer plate 32, 32' and subsequently through the inner plate 33, 33', wherein the first openings 38, 38' in the outer plate 32, 32' and the inner plate 33, 33' align. The first openings 38, 38' are also preferably spaced apart a corresponding distance as the first apertures 26, 26'. The first openings 38, 38' are further preferably spaced apart a corresponding distance as the second apertures 27, 27', wherein the first openings 38, 38' selectively align with the first apertures 26, 26' or the second apertures 27, 27' depending on whether the conveyor unit 20 is being transported or being utilized.

The first openings 38, 38' and either the first apertures 26, 26' or the second apertures 27, 27' also collectively receive a first pin 39 to secure the attachment assembly 30 to the frame 23. The first pin 39 preferably includes a head portion, wherein the head portion is positioned adjacent to the outer plate 32, 32' when the first pin 39 is within the first openings 38, 38' and the first apertures 26, 26' or the second apertures 27, 27'.

Each outer plate 32, 32' also preferably includes a pair of securing members 40, 40' extending outwardly from opposing sides of each of the first openings 38, 38'. The securing members 40, 40' each include a second opening 42, 42', wherein the second openings 42, 42' receive a second pin 44, 44' as illustrated in FIGS. 1 and 2.

The second pin 44, 44' is inserted within the second openings 42, 42' after the first pin 39, 39' is in place, wherein placement of the second pin 44, 44' prevents the first pin 39, 39' from accidentally being removed during transport or during use of the conveyor unit 20. It is appreciated that the first pin 39, 39' and/or the second pin 44, 44' may be comprised of various configurations other than the described and illustrated embodiments, wherein the first pin 39, 39' and/or the second pin 44, 44' may be comprised of configurations, such as but not limited to bolts or a locking mechanism.

D. Support Structure

The support structure 50 is attached to the attachment assembly 30 opposite the conveyor unit 20. The support structure 50 is preferably comprised of a strong and durable material such as steel, wherein the attachment assembly 30 is able to support excessive amounts of weight and extended use. The support structure 50 preferably extends from each of the connecting structures 31, 31' as illustrated in FIGS. 1 through 6. The support structure 50 includes a lower support 52 and a pair of support members 53, 53'.

The support members 53, 53' extend between a lower end of a respective inner plate 33, 33' and outer plate 32, 32' of each connecting structure 31, 31' as illustrated in FIGS. 1 through 6. A shaft 55 preferably extends through the connecting structure 31, 31' and the support members 53, 53', wherein the connecting structures 31, 31' and thus attachment assembly 30 are able to pivot about the support members 53, 53' and thus support structure 50 as illustrated in FIG. 6.

The lower support 52 of the support structure 50 extends between and across the support members 53, 53' as illustrated in FIGS. 1 through 6. The lower support 52 also preferably rotatably attaches to at least one axle 58 and a pair of wheels 59 as illustrated in FIGS. 1 through 6, wherein the wheels 59 engage the ground surface. In the preferred embodiment of the present invention, the support structure 50 includes a plurality of axles 58 and wheels 59 to support the excessive amount of weight and size of the conveyor unit 20.

E. In Use

In use, the conveyor unit 20 is first positioned in an area where the user desires to transport aggregate material 14. The first pins 39, 39' and the second pins 44, 44' are then removed from the respective first openings 38, 38' and second openings 42, 42' and a wheel block 16 that is suitable for preventing the wheels 59 from rotating is positioned behind a respective wheel 59. The conveyor unit 20 is now moved rearward by backing up the vehicle 12 and attached conveyor unit 20 until the first openings 38, 38' of the outer plate 32, 32' align with the first apertures 26, 26' of the frame 23 as illustrated in FIGS. 1 and 6. When the first openings 38, 38' and the first apertures 26, 26' align the respective first pins 39, 39' are inserted and then the second pins 44, 44' are inserted within the second openings 42, 42' to secure the first pins 39, 39' in place.

The conveyor unit 20 may now be detached from the vehicle 12 and the conveyor unit 20 may be pivoted as necessary and utilized in a normal manner to transport the aggregate material 14 as illustrated in FIG. 6. When the user is finished utilizing the conveyor unit 20 and the conveyor unit 20 is ready for transport, the first pins 39, 39' and the second pins 44, 44' are removed from the attachment assembly 30 and frame 23, thus allowing the attachment assembly 30 and support structure 50 to freely slide about the frame 23 and conveyor unit 20.

The wheel blocks 16 are now positioned in front of the respective wheel 59 to prevent the wheels 59 from moving forward. The conveyor unit 20 is now connected to the vehicle 12 via the hitch 21 and is pulled forward until the first openings 38, 38' of the outer plate 32, 32' align with the second apertures 27, 27' of the frame 23 as illustrated in FIG. 2. The first pins 39, 39' and the second pins 44, 44' may now be inserted within the first openings 38, 38' and the second openings 42, 42' thus securing the attachment assembly 30 to the frame 23. The wheel blocks 16 may now be removed and the conveyor unit 20 may be safely transported. To reutilize the conveyor unit 20 the above process is simply repeated.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A conveyor wheel sliding system, comprising:
    a conveyor unit including a frame, wherein said frame extends along a longitudinal axis of said conveyor unit and wherein said frame includes a pair of elongated members extending lengthwise along a lower side of said frame;
    an attachment assembly to engage said elongated members of said frame, wherein a substantial portion of said attachment assembly is positioned below said frame;
    wherein said attachment assembly slidably adjusts from a first end to a second end of said elongated members of said frame and along said longitudinal axis of said conveyor unit;
    wherein said attachment assembly includes a pair of connecting structures for slidably engaging said pair of elongated members of said frame, wherein said pair of connecting structures each have a U-shaped upper portion comprising an inwardly extending lip for overlying a corresponding said elongated member of said frame to prevent said connecting structure from being vertically separated from said corresponding elongated member; and at least one wheel mechanically connected to said attachment assembly opposite said conveyor unit to engage a ground surface.

2. The conveyor wheel sliding system of claim 1, wherein each of said pair of connecting structures include an engaging member between said frame and said connecting structure.

3. The conveyor wheel sliding system of claim 2, wherein said engaging member reduces a coefficient of friction between said attachment assembly and said frame.

4. The conveyor wheel sliding system of claim 1, wherein each of said pair of connecting structures include an engaging member between said frame and said U-shaped upper portion.

5. The conveyor wheel sliding system of claim 4, wherein said engaging member reduces a coefficient of friction between said attachment assembly and said frame.

6. The conveyor wheel sliding system of claim 4, wherein said engaging member is parallel to said longitudinal axis of said conveyor unit.

7. The conveyor wheel sliding system of claim 4, wherein said engaging member is comprised of a plastic material.

8. The conveyor wheel sliding system of claim 1, wherein said pair of connecting structures are substantially transverse to said frame.

9. The conveyor wheel sliding system of claim 1, wherein said frame includes at least one first aperture and at least one second aperture positioned about opposing longitudinal ends of said frame, wherein said attachment assembly includes at least one first opening to selectively align with said first aperture or said second aperture.

10. The conveyor wheel sliding system of claim 9, wherein said first aperture and said first opening or said second aperture and said first opening collectively receive a pin.

11. The conveyor wheel sliding system of claim 1, including a support structure mechanically connected between said attachment assembly and said at least one wheel.

12. The conveyor wheel sliding system of claim 11, wherein said attachment assembly is pivotally attached to said support structure.

13. The conveyor wheel sliding system of claim 1, wherein said conveyor unit is utilized to transport aggregate material.

14. The conveyor wheel sliding system of claim 1, wherein each said connecting structure includes an outer plate and an inner plate for extending along opposing sides of a corresponding said elongated member.

15. A conveyor wheel sliding system, comprising:
a conveyor unit including a frame, wherein said frame extends along a longitudinal axis of said conveyor unit;
an attachment assembly to engage said frame, wherein a substantial portion of said attachment assembly is positioned below said frame;
wherein said attachment assembly slidably adjusts about said frame and along said longitudinal axis of said conveyor unit;
wherein said attachment assembly includes a pair of connecting structures engaging opposing sides of said frame and wherein said pair of connecting structures each include a U-shaped structure to receive opposing sides of said frame;
wherein said U-shaped structure slidably adjusts along said frame: and
at least one wheel mechanically connected to said attachment assembly opposite said conveyor unit to engage a ground surface.

16. The conveyor wheel sliding system of claim 15, wherein each of said pair of connecting structures include an engaging member between said frame and said U-shaped structure.

17. The conveyor wheel sliding system of claim 16, wherein said engaging member reduces a coefficient of friction between said attachment assembly and said frame.

18. The conveyor wheel sliding system of claim 15, including a support structure mechanically connected between said attachment assembly and said at least one wheel, wherein said attachment assembly is pivotally attached to said support structure.

19. A conveyor wheel sliding system, comprising:
a conveyor unit including a frame, wherein said frame extends along a longitudinal axis of said conveyor unit;
an attachment assembly to engage said frame, wherein a substantial portion of said attachment assembly is positioned below said frame;
wherein said attachment assembly slidably adjusts about said frame and along said longitudinal axis of said conveyor unit;
at least one wheel mechanically connected to said attachment assembly opposite said conveyor unit to engage a ground surface;
wherein said attachment assembly includes a pair of connecting structures engaging opposing sides of said frame;
wherein said pair of connecting structures each include a U-shaped structure to receive opposing sides of said frame;
wherein each of said pair of connecting structures include an engaging member between said frame and said U-shaped structure;
wherein said engaging member reduces a coefficient of friction between said attachment assembly and said frame;
wherein said engaging member is parallel to said longitudinal axis of said conveyor unit;
wherein said pair of connecting structures are substantially transverse to said frame;
wherein said frame includes at least one first aperture and at least one second aperture positioned about opposing longitudinal ends of said frame, wherein said attachment assembly includes at least one first opening to selectively align with said first aperture or said second aperture;
wherein said first aperture and said first opening or said second aperture and said first opening collectively receive a pin; and
a support structure mechanically connected between said attachment assembly and said at least one wheel, wherein said attachment assembly is pivotally attached to said support structure.

20. The conveyor wheel sliding system of claim 14, wherein said outer plate and said inner plate of each said connecting structure are comprised of a triangular shape.

* * * * *